(12) United States Patent
Boxum

(10) Patent No.: US 8,568,209 B2
(45) Date of Patent: Oct. 29, 2013

(54) VEHICLE AIR-CONDITIONING SYSTEMS

(75) Inventor: Bruce Boxum, Angola, IN (US)

(73) Assignee: Dometic Corporation, Elkhart, IN (US)

( * ) Notice: Subject to any disclaimer, the term of this patent is extended or adjusted under 35 U.S.C. 154(b) by 1618 days.

(21) Appl. No.: 11/426,092

(22) Filed: Jun. 23, 2006

(65) Prior Publication Data

US 2007/0298702 A1    Dec. 27, 2007

(51) Int. Cl.
*B60J 7/22*         (2006.01)
(52) U.S. Cl.
USPC ........................................... 454/137
(58) Field of Classification Search
USPC ......... 454/129, 136, 137, 261, 141, 142, 234, 454/238, 241, 99, 70, 104, 94, 100, 130, 454/146, 150, 151, 140, 103, 232, 236, 69, 454/88, 89; 62/244, 239
See application file for complete search history.

(56) References Cited

U.S. PATENT DOCUMENTS

| | | | | |
|---|---|---|---|---|
| 2,065,445 A | * | 12/1936 | Galson | 454/87 |
| 2,171,622 A | | 10/1937 | Calkins | |
| 2,203,814 A | | 6/1940 | Clements | |
| 2,673,512 A | * | 3/1954 | Henney | 454/105 |
| 2,923,223 A | * | 2/1960 | Fall | 454/99 |
| 2,975,998 A | * | 3/1961 | Clift | 248/68.1 |
| 3,246,592 A | | 4/1966 | Rath | |
| 3,291,026 A | | 12/1966 | Simpson | |
| 3,343,473 A | * | 9/1967 | Gillick et al. | 454/99 |
| 3,520,355 A | | 7/1970 | Rueth | |
| 3,777,648 A | * | 12/1973 | Preston et al. | 454/93 |
| 3,862,549 A | * | 1/1975 | Fernandes | 62/419 |
| 4,843,826 A | * | 7/1989 | Malaker | 62/6 |
| 4,888,959 A | * | 12/1989 | Brown | 62/244 |
| 4,926,655 A | * | 5/1990 | King | 62/244 |
| 5,001,905 A | * | 3/1991 | Miyazaki | 62/244 |
| 5,090,301 A | * | 2/1992 | Soethout | 454/159 |
| 5,205,130 A | * | 4/1993 | Pannell | 62/236 |
| 5,307,645 A | * | 5/1994 | Pannell | 62/244 |
| 5,389,035 A | | 2/1995 | Ishida et al. | |
| 5,531,641 A | * | 7/1996 | Aldrich | 454/100 |
| 5,660,584 A | | 8/1997 | Serrano | |

(Continued)

FOREIGN PATENT DOCUMENTS

| | | |
|---|---|---|
| EP | 0700801 A1 | 3/1996 |
| EP | 1147971 A2 | 10/2001 |

(Continued)

*Primary Examiner* — Steven B McAllister
*Assistant Examiner* — Brittany E Towns
(74) *Attorney, Agent, or Firm* — Pearne & Gordon LLP

(57) ABSTRACT

Air-conditioning systems for vehicles include at least one air-distribution duct and at least one air-return duct. The at least one air-distribution duct is in air flow communication with at least one air-conditioning unit and is adapted to extend along a substantial portion of the interior of the vehicle. The at least one air-distribution duct includes at least one opening through which air conditioned by the at least one air-conditioning unit can be discharged to the interior of the vehicle. The at least one air-return duct also has at least one opening though which air from the interior of the vehicle can pass and be discharged from the air-return duct at a discharge location. The at least one air-return duct is adapted to extend to one or more areas of the vehicle interior so that at least one opening in the air-return duct is substantially removed from the discharge location.

8 Claims, 5 Drawing Sheets

(56) References Cited

U.S. PATENT DOCUMENTS

| | | |
|---|---|---|
| 6,116,095 A | 9/2000 | Radle |
| 6,397,942 B1 * | 6/2002 | Ito et al. ............... 165/203 |
| 6,491,578 B2 | 12/2002 | Yoshinori et al. |
| 6,536,222 B1 | 3/2003 | Ahn et al. |
| 6,877,330 B2 * | 4/2005 | Hille et al. ............... 62/244 |

FOREIGN PATENT DOCUMENTS

| | | | |
|---|---|---|---|
| FR | 2413249 | | 7/1979 |
| GB | 2012041 A | | 7/1979 |
| JP | 56057508 A | * | 5/1981 |
| JP | 63121518 A | * | 5/1988 |
| JP | 04108063 A | * | 4/1992 |

* cited by examiner

VEHICLE AIR-CONDITIONING SYSTEMS

BACKGROUND OF THE INVENTION

This invention relates generally to air-conditioning systems for vehicles and, more particularly, the invention relates to vehicle air-conditioning systems that employ both air-distribution and air-return ducts that extend to substantial portions of the interiors of the vehicles.

Vehicles of various types, including recreational vehicles such as mobile homes, motor homes, travel trailers, fifth wheelers, recreational vans and the like, commonly are provided with systems for conditioning the air of the interior of the vehicles. These air-conditioning systems typically include air-conditioning units such as, for example, air conditioners that can supply cool air to the vehicle interiors and heat pumps that can selectively furnish cool or warm air to the vehicle interiors. The air-conditioning units are often times mounted at the rooftops of the vehicles.

Typically, the air-conditioning systems include ducts for distributing the conditioned air to the vehicle interiors through registers in the ducts. The ducts and registers can be designed so that the volume of conditioned air delivered or discharged to various locations within the vehicle interiors may be selectively controlled and adjusted. Thus, if it is desired to quickly cool a particular location within a vehicle interior, the registers that control the volume of air discharged to other locations within the vehicle interior can be closed so that a greater volume of cool air is delivered to that particular location than would otherwise be the case. Generally, however, approximately equal volumes of conditioned air are delivered throughout the interior of the vehicle.

Proper operation of the air-conditioning systems requires that unconditioned air within the vehicle interior be removed and/or recycled as conditioned air is delivered to the vehicle interior. The air that is removed and/or recycled typically originates in a central, localized portion of the vehicle interior, usually directly below the air-conditioning unit, and most often is returned to the air-conditioning unit where it is recycled as conditioned air, although the removed air can be expelled to the atmosphere. It would be useful to be able to remove and/or recycle the air from outlying areas within the vehicle, such as the side areas of the vehicle, and the present invention provides for that capability.

SUMMARY OF THE INVENTION

According to one aspect, the present invention comprises an air-conditioning system for a vehicle having a roof, a ceiling, side walls, a front end and a rear end. The air-conditioning system comprises at least one air-conditioning unit, at least one air-distribution duct and at least one air-return duct. The at least one air-conditioning unit is adapted to be mounted at the exterior of the vehicle and includes an outlet portion for discharging air conditioned by the air-conditioning unit. The at least one air-distribution duct is in air flow communication with the outlet portion of the at least one air-conditioning unit and is adapted to extend along a substantial portion of the interior of the vehicle. Further, the at least one air-distribution duct includes at least one opening through which air conditioned by the at least one air-conditioning unit can be discharged to the interior of the vehicle from the air-distribution duct. The at least one air-return duct has at least one opening through which air from the interior of the vehicle can pass into the air-return duct and be discharged from the at least one air-return duct at a discharge location. The at least one air-return duct is adapted to extend to one or more areas of the interior of the vehicle so that the at least one opening in the air-return duct is substantially removed from the discharge location.

According to another aspect, the at least one air-conditioning unit is adapted to be mounted at the roof of the vehicle and includes an inlet portion. The at least one air-return duct is in air flow communication with the inlet portion of the at least one air-conditioning unit at the discharge location of the at least one air-return duct, whereby air from the interior of the vehicle discharged at the discharge location is returned to the inlet portion of the at least one air-conditioning unit. Additionally, the at least one air-distribution duct is adapted to extend along a substantial portion of the length of the interior of the vehicle between the front end and the rear end of the vehicle. In a particular aspect, the at least one air-return duct is adapted as well to extend away from the inlet portion of the air-conditioning unit along a substantial portion of the length of the interior of the vehicle between the front end and the rear end of the vehicle. In the latter case, the at least one air-return duct can be adapted to extend substantially linearly along a substantial portion of the length of the interior of the vehicle between the front end and the rear end of the vehicle. Further, both the at least one air-distribution duct and the at least one air-return duct can be adapted to extend substantially linearly along a substantial portion of the length of the interior of the vehicle between the front end and the rear end of the vehicle in a side-by-side relationship.

According to a further aspect, the at least one air-return duct is adapted to extend away from the inlet portion of the at least one air-conditioning unit toward and terminate adjacent at least one side wall of the vehicle. In that case, at least one of the at least one opening in the at least one air-return duct can be located adjacent the termination of the at least one air-return duct.

According to still another aspect, the outlet portion of the at least one air-conditioning unit is adapted to be located between the front end and the rear end of the vehicle and between a first side wall and a second side wall of the vehicle. The at least one air-distribution duct is adapted to extend from the outlet portion of the at least one air-conditioning unit toward the front end of the vehicle and from the outlet portion of the air-conditioning unit toward the rear end of the vehicle. The inlet portion of the at least one air-conditioning unit also is adapted to be located between the front end and the rear end of the vehicle and between the first side wall and the second side wall of the vehicle. The at least one air-return duct is adapted to extend away from the inlet portion of the at least one air-conditioning unit toward and terminate adjacent the first side wall of the vehicle and away from the inlet portion of the at least one air-conditioning unit toward and terminate adjacent the second side wall of the vehicle. The at least one of the at least one opening in the at least one air-return duct can be located adjacent the termination of the at least one air-return duct adjacent the first side wall of the vehicle and at least one of the at least one opening in the at least one air-return duct can be located adjacent the termination of the at least one air-return duct adjacent the second side wall of the vehicle.

According to yet another aspect, the at least one air-distribution duct comprises a pair of air-distribution ducts. Each of the pair of air-distribution ducts is adapted to extend from a location toward the front end of the vehicle to a location toward the rear end of the vehicle, and an air-distribution cross duct is located between the pair of air-distribution ducts and in air flow communication with each of the pair of air-distribution ducts and the outlet portion of the at least one air-conditioning unit. Air conditioned by the at least one air-conditioning unit can flow through the air-distribution cross duct to the pair of air-distribution ducts. With this aspect, the at least one air-return duct can be adapted to extend away from the inlet portion of the at least one air-conditioning unit toward and terminate adjacent the first side wall of the vehicle and away from the inlet portion of the air-conditioning unit toward and terminate adjacent the second side wall of the vehicle. In the latter case, the at least one of the at least one opening in the at least one air-return duct can be located adjacent the termination of the at least one air-return duct adjacent the first side wall of the vehicle and at least one of the at least one opening in the at least one air-return duct can be located adjacent the termination of the at least one air-return duct adjacent the second side wall of the vehicle.

According to still another aspect, the at least one air-return duct comprises a pair of air-return ducts and an air-return cross duct located between the pair of air-return ducts. Each of the pair of air-return ducts is adapted to extend from a first end located toward the front end of the vehicle to a second end located toward the rear end of the vehicle adjacent a respective one of the first side wall and the second side wall of the vehicle. The air-return cross duct is located between the pair of air-return ducts and is in air flow communication with each of the pair of air-return ducts and the inlet portion of the at least one air-conditioning unit, whereby air from the interior of the vehicle can flow through the pair of air-return ducts and the air-return cross duct to the inlet portion of the at least one air-conditioning unit. With this aspect, an opening for air flow can be located at each of the first end and second end of each of the pair of air-return ducts.

According to still a further aspect, the outlet portion of the at least one air-conditioning unit is adapted to be located between the front end and the rear end of the vehicle and between a first side wall and a second side wall of the vehicle. The at least one air-distribution duct includes a first section adapted to extend from the vicinity of the outlet portion of the at least one air-conditioning unit toward the front end of the vehicle nearer the first side wall of the vehicle than the second side wall of the vehicle and a second section adapted to extend from the vicinity of the outlet portion of the at least one air-conditioning unit toward the rear end of the vehicle nearer the second side wall of the vehicle than the first side wall of the vehicle. An air-distribution duct joining section joins the first and second sections of the at least one air-distribution duct in the vicinity of the outlet of the at least one air-conditioning unit and is in air flow communication with the outlet portion of the at least one air-conditioning unit and the first and second sections of the at least one air-distribution duct in the vicinity of the outlet portion of the at least one air-conditioning unit. Air conditioned by the at least one air-conditioning unit can flow through the air-distribution duct joining section to the first and second sections of the at least one air distribution duct. The inlet portion of the at least one air-conditioning unit is adapted to be located between the front end and the rear end of the vehicle and between the first side wall and the second side wall of the vehicle. And the at least one air-return duct is adapted to extend away from the inlet portion of the at least one air-conditioning unit toward and terminate adjacent the first side wall of the vehicle and away from the inlet portion of the at least one air-conditioning unit toward and terminate adjacent the second side wall of the vehicle. With this aspect, at least one of the at least one opening in the at least one air-return duct can be located adjacent the termination of the at least one air-return duct adjacent the first side wall of the vehicle. And at least one of the at least one opening in the at least one air-return duct can be located adjacent the termination of the at least one air return duct adjacent the second side wall of the vehicle. Also with this aspect, the at least one air-return duct can comprise a pair of air-return ducts. Each of the pair of air-return ducts is adapted to extend from a first end located toward the front end of the vehicle to a second end located toward the rear end of the vehicle adjacent a respective one of the first side wall and the second side wall of the vehicle. An air-return cross duct is located between the pair of air-return ducts and is in air flow communication with each of the pair of air-return ducts and the inlet portion of the air-conditioning unit, whereby air from the interior of the vehicle can flow through the air-return ducts and the air-return cross duct to the inlet portion of the at least one air-conditioning unit. Additionally with this aspect, an opening can be located at each of the first end and second end of each of the pair of air return ducts.

According to yet another aspect, the outlet portion of the at least one air-conditioning unit is adapted to be located between the front end and the rear end of the vehicle and between a first side wall and a second side wall of the vehicle and the at least one air-distribution duct comprises a pair of air-distribution ducts. Each of the pair of air-distribution ducts is adapted to extend from a location toward the front end of the vehicle to a location toward the rear end of the vehicle and an air-distribution cross duct is located between the pair of air-distribution ducts and is in air flow communication with each of the pair of air-distribution ducts and the outlet portion of the at least one air-conditioning unit, whereby air conditioned by the at least one air-conditioning unit can flow through the air-distribution cross duct to the pair of air-distribution ducts. The inlet portion of the at least one air-conditioning unit is adapted to be located between the front end and the rear end of the vehicle and between the pair of air-distribution ducts, and the at least one air-return duct is adapted to extend away from the inlet portion of the at least one air-conditioning unit and terminate toward one of the front end and the rear end of the vehicle. With this aspect, the at least one air-return duct can comprise three independent air-return ducts adapted to extend away from the inlet portion of the at least one air-conditioning unit in the same direction and terminate toward one of the front end and the rear end of the vehicle. Also with this aspect, each air return duct can have an opening located adjacent the termination of the air return duct.

In all of the foregoing aspects, the air-distribution ducts and the air-return ducts of the air-conditioning system can be adapted to be supported between the ceiling and the roof of the vehicle.

BRIEF DESCRIPTION OF THE DRAWINGS

A brief description of the drawings is as follows.

It will be appreciated that the drawings are presented in such a way as to facilitate an understanding of the various embodiments of the invention and are not to scale; nor are the dimensions of the various components of the several embodiments of the invention necessarily the same in the various figures of the drawings.

DETAILED DESCRIPTION OF SEVERAL EMBODIMENTS OF THE INVENTION

Figure 1:
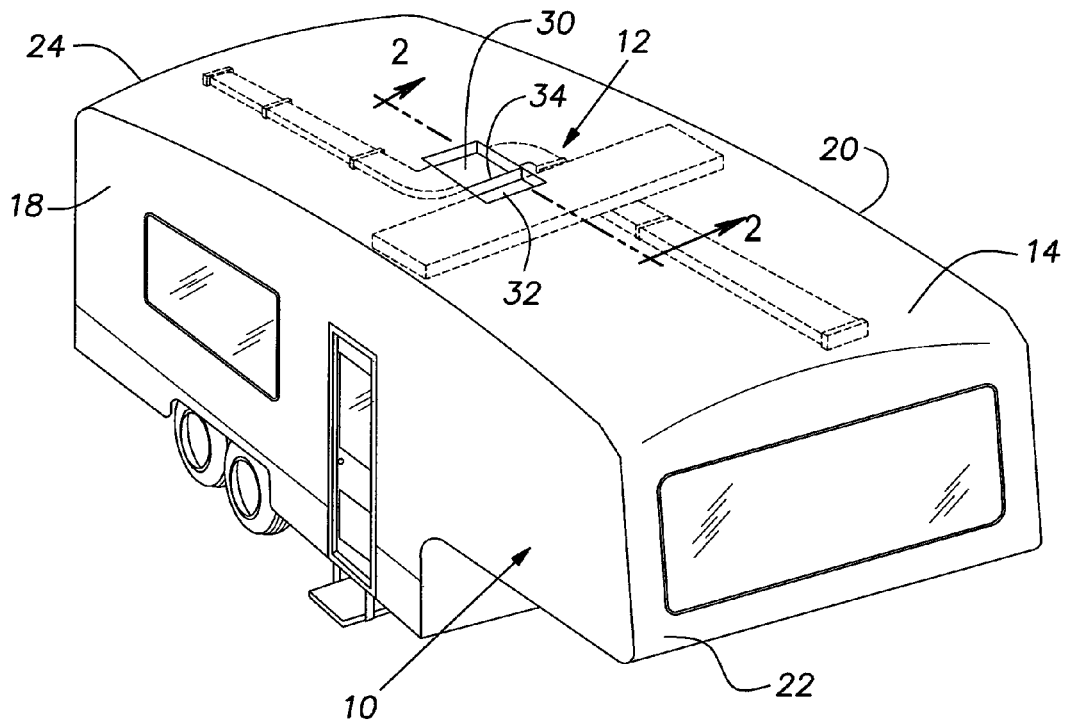
FIG. 1 is a perspective view of a vehicle having an air-conditioning system in accordance with one embodiment of the present invention with the air-conditioning unit of the system not shown at the roof of the vehicle in order to facilitate an understanding of the description of the system.

FIG. 1 shows a recreational vehicle, indicated generally at 10, having an air-conditioning system, indicated generally at 12, constructed according to one embodiment of the invention. The vehicle 10 includes a roof 14; a ceiling 16 (see FIG. 2); side walls, comprising a first side wall 18 and a second side wall 20; a front end 22; and a rear end 24. As used herein, the term "recreational vehicle" refers to mobile homes, motor homes, travel trailers, fifth wheelers, recreational vans and the like. In addition, although the various embodiments of the invention are described herein with reference to their application to recreational vehicles, the embodiments can be applied to other vehicles such as passenger buses for example.

Figure 2:
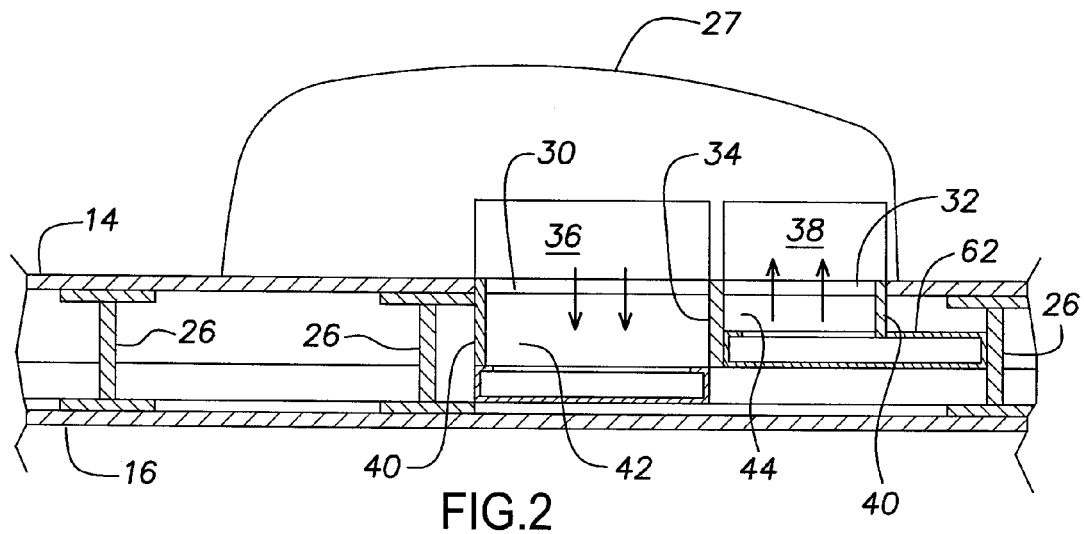
FIG. 2 is a fragmented cross-sectional view taken along line 2-2 of FIG. 1 with the air-conditioning unit shown in place at the roof of the vehicle.
Figures 3, 4:
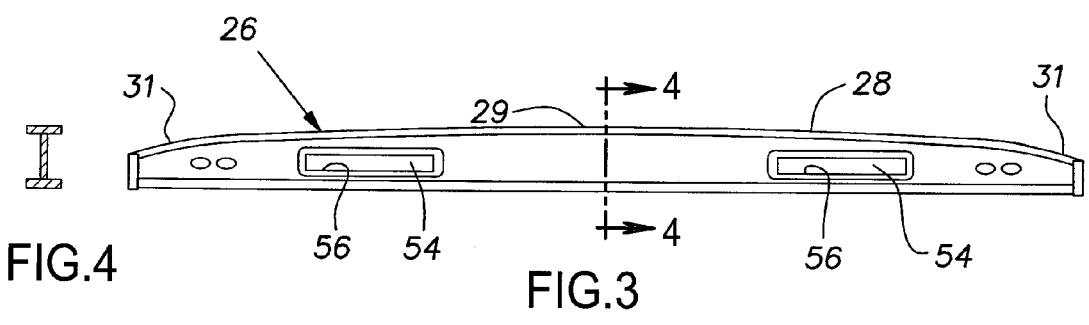
FIG. 3 is a front elevational view of one type of rafter that can be used to support the roof of the vehicle.
FIG. 4 is a cross-sectional view taken along line 4-4 of FIG. 3.
Figure 5:
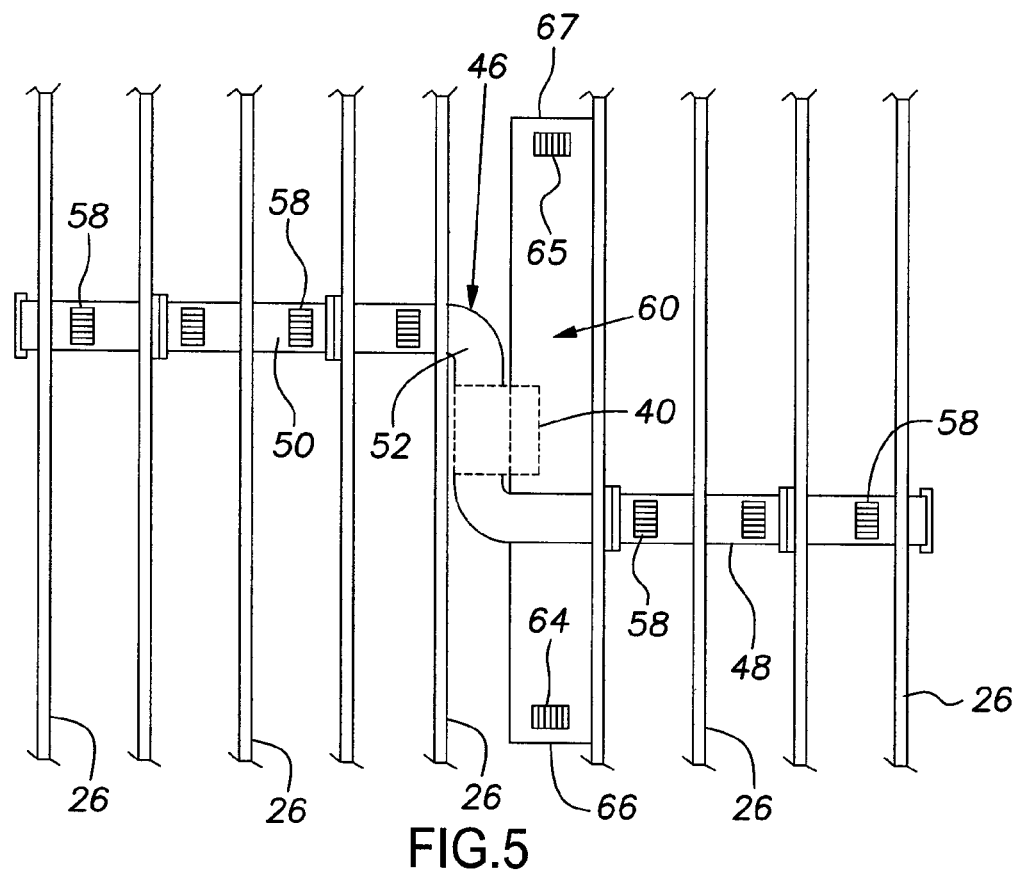
FIG. 5 is a fragmented plan view of the air-conditioning system of FIG. 1 viewed from the interior of the vehicle with the ceiling removed so as to facilitate an understanding of the description of the system.

As best seen in FIGS. 2 and 5, the roof and ceiling structure of the vehicle comprises a plurality of rafters 26 that span and are supported at the side walls 18 and 20 of the vehicle. The rafters are in place essentially over the entire length of the vehicle from the front end 22 to the rear end 24. In the embodiment of the invention shown in FIGS. 1, 2 and 5, the rafters 26 are constructed of aluminum and, as best seen in FIGS. 3 and 4, the upper surface 28 of each of the rafters, over and on which roofing materials are laid to form roof 14, is curvilinear with the central portion 29 of the rafter being somewhat higher than the end portions 31 of the rafters so that water, ice, snow and the like will not collect on the roof of the vehicle.

Two openings 30 and 32 are provided in the roof 14 of the vehicle between two of the rafters 26. In the embodiment of the invention shown in FIGS. 1, 2 and 5, the openings are located between the front end 22 and rear end 24 of the vehicle and between the first side wall 18 and the second side wall 20 of the vehicle. The openings 30 and 32 are separated from one another by a plate 34 for purposes described in more detail below.

The air-conditioning system of the present invention comprises at least one air-conditioning unit, at least one air-distribution duct and at least one air-return duct. In the embodiment shown in FIGS. 1, 2 and 5, the air-conditioning system 12 includes a single air-conditioning unit 27 that is adapted to be mounted at the exterior, such as the roof 14, of the vehicle over the openings 30 and 32. FIG. 1 does not show the air-conditioning unit in place on the roof of the vehicle so that the openings 30 and 32 can be more readily illustrated, but FIG. 2 includes a depiction of the air-conditioning unit 27 as installed at the roof 14 of the vehicle 10. As illustrated in the drawings, the air-conditioning unit 27 can be located nearer the center of the vehicle 10 than either the front end 22 or the rear end 24 of the vehicle and nearer the center of the vehicle than either the first side wall 18 or the second side wall 20 of the vehicle.

The air-conditioning unit 27 can be mounted at the roof 14 of the vehicle by suitable fasteners in a manner that will be familiar to those having ordinary skill in the art. And the air-conditioning unit can be any type of unit that conditions air. For example, the unit can comprise an air conditioner that is designed to only generate cool air or the unit can comprise a heat pump that can selectively generate cool and warm air. Further, more than one air-conditioning unit can be provided. Where more than one air-conditioning unit is provided, the units can be combined to serve a single air-distribution and air-return duct or each unit can separately serve an air-distribution and air-return duct.

As best seen in FIG. 2, the embodiment of the air-conditioning unit shown in that figure includes an outlet portion 36 for discharging air conditioned by the air-conditioning unit. The outlet portion 36 is in air flow communication with opening 30 through which air conditioned by the air-conditioning unit 27 can be discharged. The air-conditioning unit also includes an inlet portion 38 in air flow communication with opening 32 for receiving return air that is to be conditioned and recycled. Thus in this arrangement, the outlet portion 36 and the inlet portion 38 of the air-conditioning unit are adapted to be located between the front end 22 and the rear end 24 of the vehicle and between the first side wall 18 and the second side wall 20 of the vehicle.

According to one aspect, the size of the combined openings 30 and 32 is 14 inches by 14 inches while the dimensions of the openings individually can vary. Thus, for example, the opening 30 can range from 7 inches by 14 inches to 8.5 inches by 14 inches. Correspondingly, the opening 32 can range from 7 inches by 14 inches to 5.5 inches by 14 inches.

Located below and in air flow communication with the openings 30 and 32 is a plenum 40 as shown in FIG. 2. The plenum is attached to the underside of the roof 14 in any suitable manner familiar to those skilled in the art and includes two chambers 42 and 44 that are isolated from one another by the plate 34 so that air cannot pass between the two chambers 42 and 44 and the conditioned air is kept isolated from the unconditioned or return air.

In all of the embodiments of the invention illustrated in the drawings, at least one air-distribution duct is in air flow communication with the outlet portion of the air-conditioning unit and is adapted to extend along a substantial portion of the interior of the vehicle between the front end 22 and the rear end 24 of the vehicle. Additionally, the at least one air-distribution duct includes at least one opening through which air conditioned by the air-conditioning unit can be discharged to the interior of the vehicle from the air-distribution duct. By having the at least one air-distribution duct extend along a substantial portion of the interior of the vehicle the conditioned air can be distributed to much of, and in some cases the entirety of, the interior of the vehicle.

In the embodiment of the invention shown in FIGS. 1, 2 and 5, the at least one air-distribution duct, indicated generally at 46 and generally rectangular in cross-section, is adapted to extend from the outlet portion 36 of the air-conditioning unit 27 toward the front end 22 of the vehicle and from the outlet portion of the air-conditioning unit toward the rear end 24 of the vehicle. Thus, the at least one air-distribution duct 46 includes a first section 48 that is adapted to extend from the vicinity of the outlet portion 36 of the air-conditioning unit 27 and opening 30 toward the front end 22 of the vehicle nearer the first side wall 18 of the vehicle than the second side wall 20 of the vehicle. The at least one air-distribution duct 46 also includes a second section 50 that is adapted to extend from the vicinity of the outlet portion 36 and opening 30 of the air-conditioning unit toward the rear end 24 of the vehicle nearer the second side wall 20 of the vehicle than the first side wall 18 of the vehicle. An air-distribution duct joining section 52 joins the first and second air-distribution sections 48 and 50 of the at least one air-distribution duct in the vicinity of the outlet portion 36 of the air-conditioning unit 27 and opening 30 and is in air flow communication with the outlet portion of the air-conditioning unit and the first and second sections of the at least one air distribution duct in the vicinity of the outlet portion of the air-conditioning unit and opening 30. With this arrangement, air conditioned by the air-conditioning unit can flow through the air-distribution duct joining section 52 to the first and second air-distribution duct sections 48 and 50, respectively, of the at least one air-distribution duct 46.

The first and second air-distribution duct sections 48 and 50 of the at least one air-distribution duct 46 are supported between the ceiling 16 and the roof 14 of the vehicle 10 by the rafters 26. More specifically with reference to FIGS. 3 and 4, openings 54 somewhat larger than the outer perimeter of the air-distribution duct sections 48 and 50 are provided in the rafters 26 through which the air-distribution duct sections pass and the air-distribution duct sections rest on the bottoms 56 of the openings. The various embodiments of the present invention can be employed with roof constructions that do not employ the aluminum rafters illustrated in FIGS. 2, 3 and 4 however. For example, in place of the aluminum rafters, the upper portion of the vehicle can be constructed of a plurality of wooden structural units each of which comprises a wooden rafter that extends between the two side walls of the vehicle at the top of the vehicle and an outwardly bowed wooden element that is attached at its two ends to respective ends of the wooden rafter. In that case, the air-distribution ducts would rest on the tops of the wooden rafters in the space between the rafters and their associated wooden bowed elements. According to one aspect, the height of each duct section can vary from 1.5 inches to 2.4 inches depending on various features such as for example the roof thickness and the precise layout of the duct sections.

Naturally it is necessary that the at least one air-distribution duct include at least one opening through which air conditioned by the air-conditioning unit can be discharged to the interior of the vehicle from the air-distribution duct. In the embodiment of the invention shown in FIGS. 1, 2 and 5, a plurality of registers 58 are located along the first and second air-distribution sections 48 and 50 of the at least one air-distribution duct 46 for that purpose. Openings are provided in the ceiling 16 so as to coincide with the registers 58 to allow conditioned air to be discharged to the interior of the vehicle.

It is also necessary, as conditioned air is discharged to the interior of the vehicle through the registers 58, that air be removed from the vehicle interior or recycled. At least one air-return duct of the air-conditioning system of the invention is employed for that purpose. The at least one air-return duct has at least one opening through which air from the interior of the vehicle can pass into the air-return duct and be discharged from the at least one air-return duct at a discharge location. The at least one air-return duct is adapted to extend to one or more areas of the interior of the vehicle so that the at least one opening in the air-return duct is substantially removed from the discharge location and thereby allow for the removal of what can be relatively stagnant air in such outlying areas of the interior of the vehicle.

Although the discharge location can be variously positioned, such as for example at the exterior of the vehicle whereby the air removed from the vehicle interior is discharged to the surrounding atmosphere, in the embodiment of the invention shown in FIGS. 1, 2 and 5, an at least one air-return duct 60, generally rectangular in cross-section, is in air flow communication with the inlet portion 38 of the air-conditioning unit at the discharge location 62 of the at least one air-return duct. With this arrangement, air from the interior of the vehicle discharged at the discharge location 62 is returned to the inlet portion 38 of the air-conditioning unit 27 through opening 32. Thus, air from the interior of the vehicle is returned to the air conditioner by the air-return duct 60 and is recycled in the air-conditioner so as to produce conditioned air which is redistributed to the interior of the vehicle.

It is contemplated in several of the embodiments of the invention that the at least one air-return duct be adapted to extend away from the inlet portion 38 of the air-conditioning unit toward and terminate adjacent at least one side wall of the vehicle. In that case, at least one of the at least one opening in the at least one air-return duct can be located adjacent the termination of the at least one air-return duct. In the embodiment of the invention shown in FIGS. 1, 2 and 5 the at least one air-return duct 60 is adapted to extend away from the inlet portion 38 of the air-conditioning 27 toward and terminate adjacent the first side wall 18 of the vehicle and away from the inlet portion 38 of the air-conditioning unit 27 toward and terminate adjacent the second side wall 20 of the vehicle. At least one opening 64 of the at least one opening in the at least one air-return duct 60 is located adjacent the termination 66 of the at least one air-return duct adjacent the first side wall 18 of the vehicle and at least one opening 65 of the at least one opening in the at least one air-return duct 60 is located adjacent the termination 67 of the at least one air-return duct 60 adjacent the second side wall 20.

Figure 6:
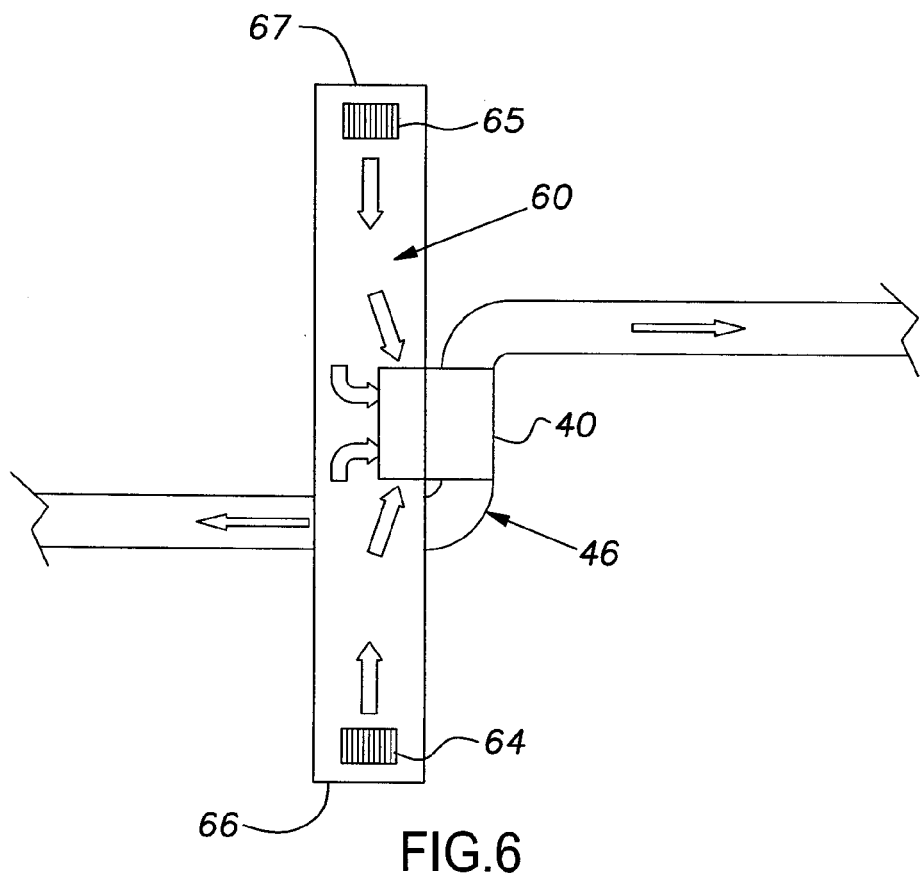
FIG. 6 is a somewhat schematic representation of the embodiment of the air-conditioning system shown in FIG. 1 for the purpose of illustrating the flow of air through the air-conditioning system as viewed from above the system.

The arrows in FIG. 6 of the drawings indicate the direction of air flow in the first embodiment of the invention as viewed from above. As shown, the cool air from the outlet portion 36 of the air-conditioning unit flows outwardly to several areas within the vehicle interior, wherever discharge openings in the air-distribution duct 46 are located and, as the cool air is discharged into the vehicle interior, warmer air is removed from the vehicle interior and flows through the registers 64 and 65 in the air-return duct 60 to the inlet portion 38 of the air-conditioning unit 27.

It will be apparent to those having ordinary skill in the art that the dimensions of the openings 30 and 32 and the air-distribution duct 46 and the air-return duct 60 as well as the dimensions of the openings in the air-return duct at the registers 64 and 65 and the openings in the air-distribution duct at the registers 58 should be coordinated so as to allow for a balanced air flow through the ducts and into the vehicle interior. This is also the case with the various openings and ducts provided in the other embodiments of the invention as described below. It will also be apparent to those skilled in the art that these dimensions can vary.

Although not shown in the drawings, the spaces between the rafters 26 between the roof 14 and the ceiling 16 can be filled with insulation. This is the case not only for the embodiment of the invention shown in FIGS. 1, 2 and 5 but also with the other embodiments of the invention. Because of the extended lengths of the air-distribution ducts and the air-return ducts, it may be appropriate to provide for more insulation than would otherwise be the case so as to protect the ducts against the temperature load from the outside of the vehicle such as the heat load from the sun. For this reason, and to accommodate two thicknesses of duct material, it may be required to provide five or more inches of clearance between the roof and the ceiling.

Figure 7:
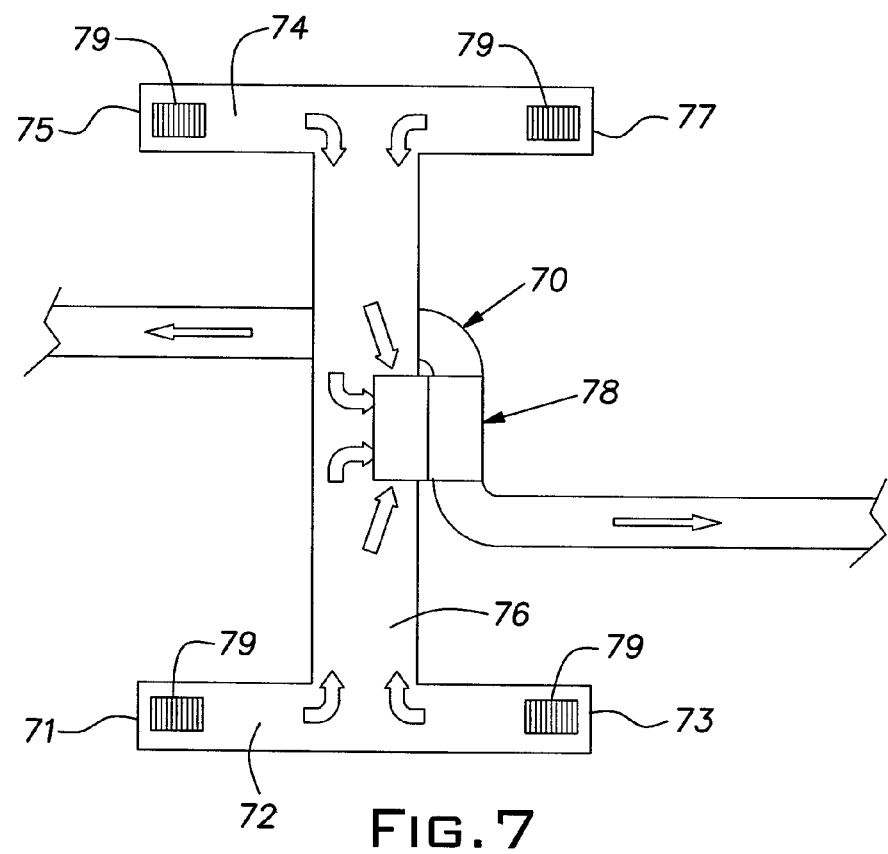
FIG. 7 is a somewhat schematic representation of a second embodiment of the invention.

Turning now to the embodiment of the invention shown in FIG. 7, the air-conditioning system as seen from above comprises an air-distribution duct 70 that is of a similar construction to the air-distribution duct 46 shown in FIGS. 1, 2 and 5. The air-distribution duct 70, generally rectangular in cross-section, is in air-flow communication with the outlet portion 36 of the air-conditioning unit 27 at the plenum 78 whereby conditioned air from the air-conditioner can be distributed through suitable openings, not shown, in duct 70 to the interior of the vehicle, as indicated by the arrows on duct 70. In this embodiment, the at least one air-return duct comprises a pair of air-return ducts 72 and 74, each generally rectangular in cross-section, and an air-return cross duct 76, also generally rectangular in cross-section, located between the pair of air-return ducts. Each one of the pair of air-return ducts 72 and 74 is adapted to extend from a first end, 73 in the case of air-return duct 72 and 77 in the case of air-return duct 74, located toward the front end 22 of the vehicle to a second end, 71 in the case of the air-return duct 72 and 75 in the case of the air-return duct 74, located toward the rear end 24 of the vehicle. Each one of the pair of air-return ducts is adjacent a respective one of the first side wall 18 and the second side wall 20 of the vehicle. Thus, the air-return duct 72 is adjacent side wall 18 and the air-return duct 74 is adjacent side wall 20. The air-return cross duct 76, located between the pair of air-return ducts is in air flow communication with each of the pair of air-return ducts 72 and 74 and the inlet portion 38 of the air-conditioning unit 27 at the plenum 78, whereby air from the interior of the vehicle can flow through the pair of air-return ducts 72 and 74 and the air-return cross duct 76 to the inlet portion 38 of the air-conditioning unit as indicated by the arrows on the pair of air-return ducts and the cross duct. Openings in the form of registers 79 are located at each of the first end and second end of each of the pair of air-return ducts for that purpose. Plenum 78 is constructed in a manner that will be understood by those having ordinary skill in the art so that the conditioned air from the air-conditioning unit is kept isolated from the unconditioned air returning to the air-conditioning unit.

Figure 8:
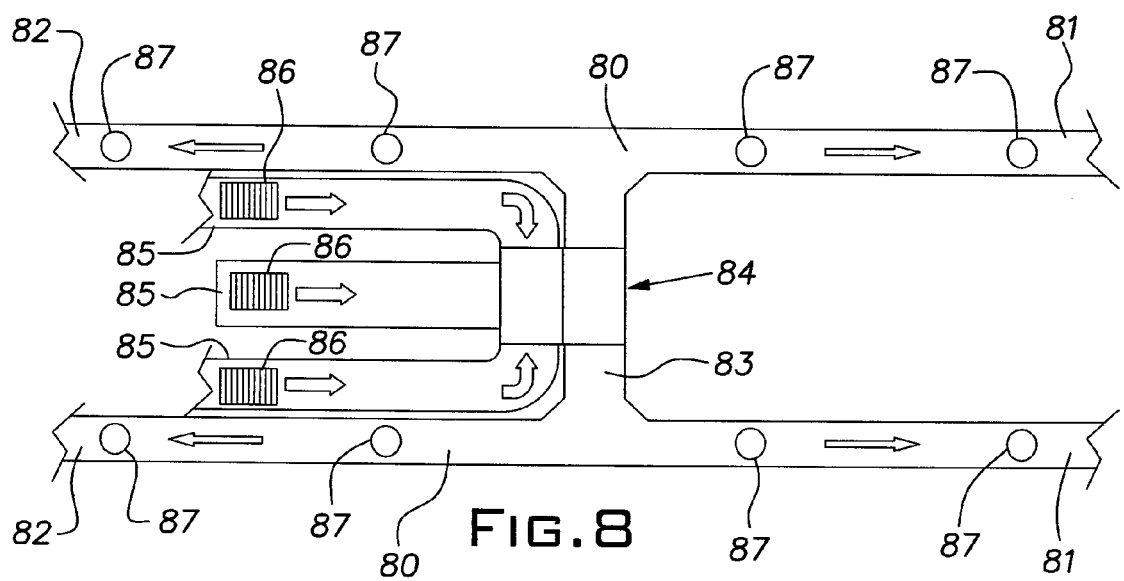
FIG. 8 is a somewhat schematic representation of a third embodiment of the invention.

In the embodiment of the invention illustrated in FIG. 8 as seen from above, the at-least one air-distribution duct comprises a pair of air-distribution ducts 80 generally rectangular in cross section. Each of the pair of air-distribution ducts 80 is adapted to extend from a location 81 toward the front 22 of the vehicle to a location 82 toward the rear end 24 of the vehicle. An air-distribution cross duct 83 generally rectangular in cross-section is located between the pair of air-distribution ducts 80 and is in air flow communication with each of the pair of air-distribution ducts and the outlet portion 36 of the air-conditioning unit 27 at the plenum 84. As a result, air conditioned by the air-conditioning unit 27 can flow through the air-distribution cross duct 83 to the pair of air-distribution ducts 80 as indicated by the arrows on the pair of air-distribution ducts and be distributed to various areas within the vehicle interior through openings 87 in the air-distribution ducts. The inlet portion 38 of the air-conditioning unit 27 is adapted to be located between the pair of air-distribution ducts 80 at the plenum 84 and there is at least one air-return duct that is in air flow communication with the inlet portion 38 of the air-conditioning unit 27 and is adapted to extend away from the inlet portion 38 of the air-conditioning unit and terminate toward one of the front end 22 and rear end 24 of the vehicle. In the particular embodiment illustrated in FIG. 8, the at least one air-return duct comprises three independent air-return ducts 85 generally rectangular in cross section that are adapted to extend away from the inlet portion 28 of the air-conditioning unit in the same direction and terminate toward the rear end 24 of the vehicle. Each air-return duct 85 is provided with an opening in the form of a register 86, which can be located adjacent the termination of the air-return duct and through which air from outlying areas of the interior of the vehicle is returned through the opening 32 to the air-conditioning unit 27 as indicated by the arrows on the air-return ducts 85. Plenum 84 is constructed in a manner that will be understood by those having ordinary skill in the art so that the conditioned air from the air-conditioning unit is kept isolated from the unconditioned air returning to the air-conditioning unit.

Figure 9:
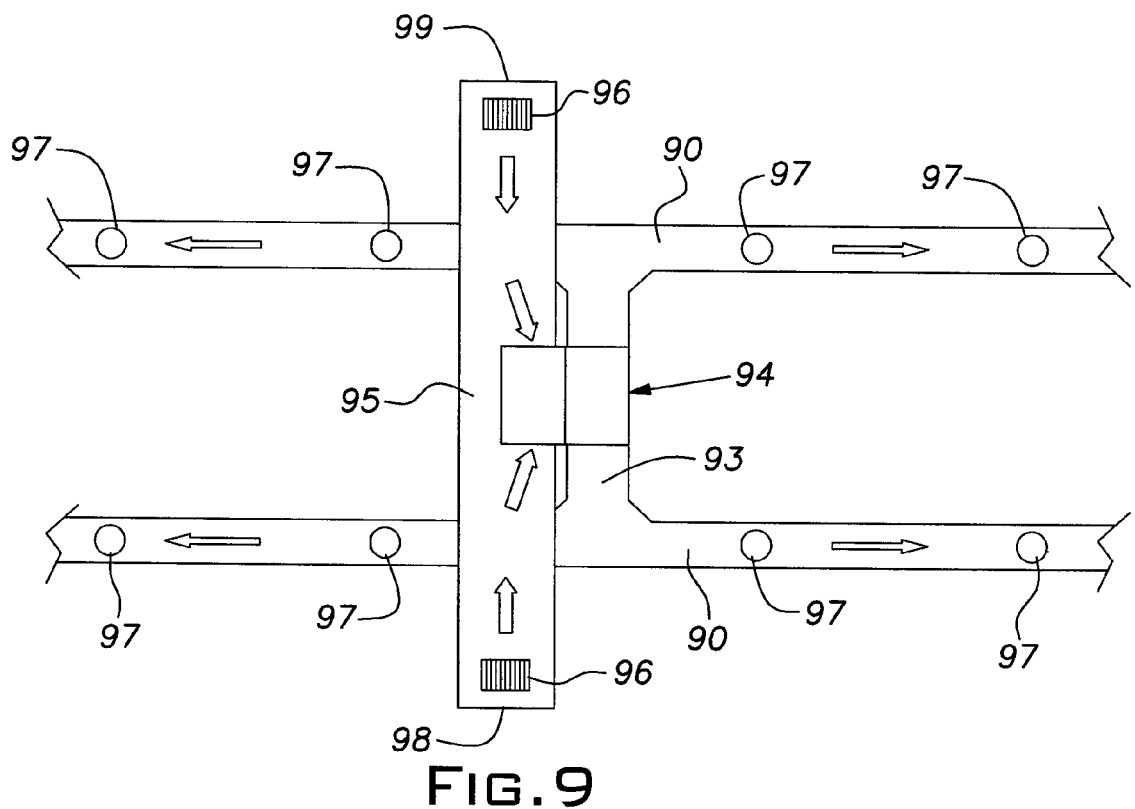
FIG. 9 is a somewhat schematic representation of a fourth embodiment of the invention.

In the embodiment of the invention illustrated in FIG. 9 as seen from above, the air-conditioning system includes a pair of air-distribution ducts 90 generally rectangular in cross-section and an air-distribution cross duct 93 generally rectangular in cross-section similar in construction to the pair of air-distribution ducts and air-distribution cross duct described in the embodiment of the invention illustrated in FIG. 8. The air-distribution cross duct 93 is in air flow communication with each of the pair of air distribution ducts 90 and the outlet portion 36 of the air-conditioning unit 27 at the plenum 94. As with the embodiment of FIG. 8, air conditioned by the air-conditioning unit 27 can flow through the air-distribution cross duct 93 to the pair of air-distribution ducts 90 as indicated by the arrows on the pair of air-distribution ducts and be distributed to the interior of the vehicle through the openings 97. The inlet portion 38 of the air-conditioning unit 27 is adapted to be located between the pair of air-distribution ducts 90 at the plenum 94. An air-return duct 95 generally rectangular in cross-section is in air flow communication with the inlet portion 38 of the air-conditioning unit 27 and is adapted to extend away from the inlet portion of the air-conditioning unit and terminate adjacent the first wall 18 of the vehicle and away from the inlet portion of the air-conditioning unit toward and terminate adjacent the second side wall 20 of the vehicle. At least one opening in the form of a register 96 in the air-return duct 95 is located adjacent the termination 98 of the air-return duct adjacent the first side wall 18 of the vehicle, and at least one opening in the form of a register 96 is located adjacent the termination 99 of the air-return duct adjacent the second side wall 20 of the vehicle. As cool air is distributed into the vehicle interior through openings 97 in the pair of air-distribution ducts 90, warmer air is removed from outlying areas in the vehicle interior adjacent the side walls of the vehicle interior and flows through the air-return duct 95 to the inlet portion 38 of the air-conditioning unit 27 as indicated by the arrows on air-return duct 95. The removed air is then recycled through the air-conditioning unit 27. Plenum 94 is constructed in a manner that will be understood by those having ordinary skill in the art so that the conditioned air from the air-conditioning unit is kept isolated from the unconditioned air returning to the air-conditioning unit.

Figure 10:
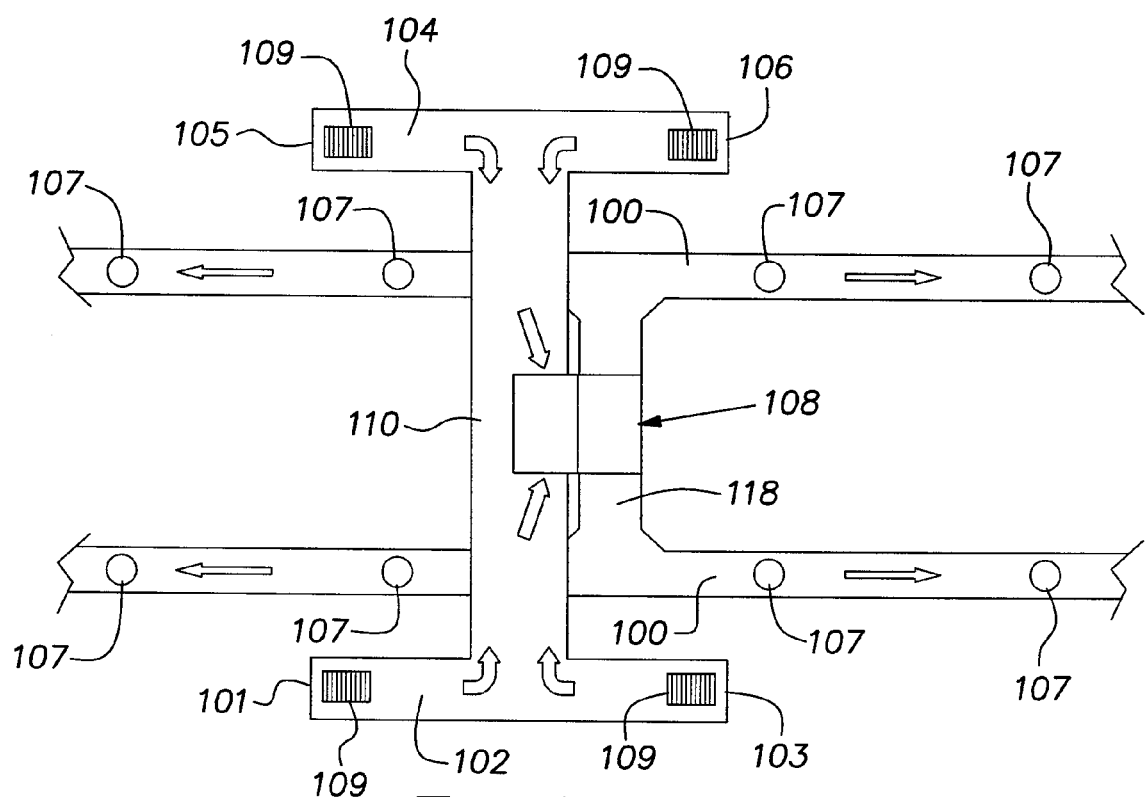
FIG. 10 is a somewhat schematic representation of a fifth embodiment of the invention.

A fifth embodiment of the invention is shown in FIG. 10 as seen from above. Once again, the air-conditioning system includes a pair of air-distribution ducts 100 generally rectangular in cross-section and an air-distribution cross duct 118 also generally rectangular in cross-section and similar in construction to the pair of air-distribution ducts and air-distribution cross duct described in the embodiments illustrated in FIGS. 8 and 9. The air-distribution cross duct 118 is in air flow communication with each of the pair of air-distribution ducts 100 and the outlet portion 36 of the air-conditioning unit 27 at the plenum 108. As with the embodiments of FIGS. 8 and 9, air conditioned by the air-conditioning unit 27 can flow through the air-distribution cross duct 118 to the pair of air-distribution ducts 100 as indicated by the arrows on the pair of air-distribution ducts and be distributed to the interior of the vehicle through the openings 107. The inlet portion 38 of the air-conditioning unit 27 is adapted to be located between the pair of air-distribution ducts 100 at the plenum 108.

In the embodiment of FIG. 10, a pair of air-return ducts 102 and 104 generally rectangular in cross-section are provided and an air-return cross duct 110 generally rectangular in cross-section joins the pair of air-return ducts. Each of the pair of air-return ducts 102 and 104 is adapted to extend from a first end, 103 in the case of air-return duct 102 and 106 in the case of air-return duct 104, located toward the front end 22 of the vehicle to a second end, 101 in the case of the air-return duct 102 and 105 in the case of the air-return duct 104, located toward the rear end 24 of the vehicle. Each of the pair of air-return ducts is adjacent a respective one of the first side wall and the second side wall of the vehicle. Thus, the air-return duct 102 is adjacent side wall 18 and the air-return duct 104 is adjacent side wall 20. The air-return cross duct 110 located between the pair of air-return ducts 102 and 104 is in air flow communication with each of the pair of air-return ducts 102 and 104 and the inlet portion 38 of the air-conditioning unit 27 at the plenum 108, whereby air from the interior of the vehicle can flow through the pair of air-return ducts 102 and 104 and the air-return cross duct 110 to the inlet portion 38 of the air-conditioning unit 27 as indicated by the arrows on the pair of air-return ducts and the cross duct. Openings in the form of registers 109 are located at each of the first end and second end of each of the pair of air-return ducts for that purpose. Plenum 108 is constructed in a manner that will be understood by those having ordinary skill in the art so that the conditioned air from the air-conditioning unit is kept isolated from the unconditioned air returning to the air-conditioning unit.

Figure 11:
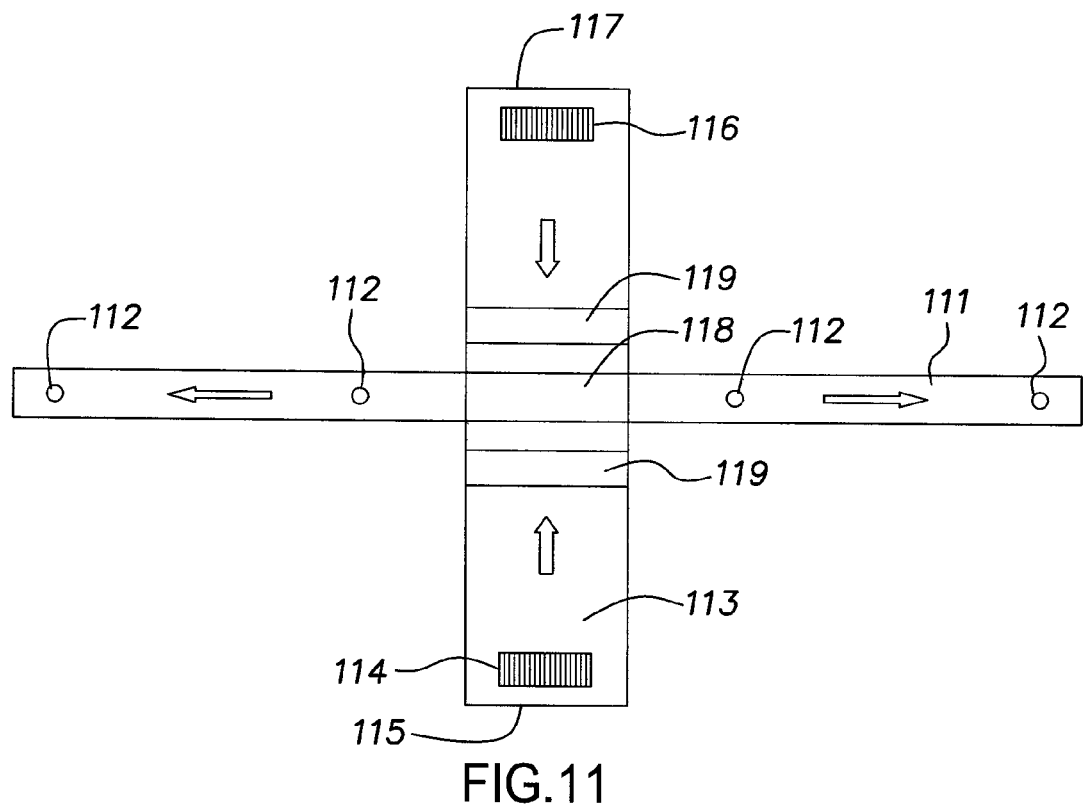
FIG. 11 is a somewhat schematic representation of a sixth embodiment of the invention.

A sixth embodiment of the invention is shown in FIG. 11 as seen from above. In this embodiment, the air-distribution duct 111 generally rectangular in cross-section is adapted to extend substantially linearly along a substantial portion of the length of the interior of the vehicle between the front end 22 and the rear end 24 of the vehicle on either side of the outlet portion 36 of the air-conditioning unit 27. Openings 112 are provided in the air-distribution duct so that conditioned air from the air-conditioning unit can be distributed to the outlying areas of the interior of the vehicle. Using suitable ducting, including plenum arrangements, as will be understood by those having ordinary skill in the art, an opening 118 to the air-distribution duct 111 is placed in air flow communication with opening 30 which is located at the output portion 36 of the air-conditioning unit 27. Thus, conditioned air from the air-conditioning unit 27 can flow from the output portion 36 of the air-conditioning unit through the opening 30 and the opening 118 into the air-distribution duct 111 and into the interior of the vehicle through openings 112 in the distribution duct.

In the embodiment of FIG. 11, the at least one air-return duct 113 generally rectangular in cross-section is adapted to extend away from the inlet portion 38 of the air-conditioning unit 27 toward and terminate adjacent the first side wall 18 of the vehicle and away from the inlet portion of the air-conditioning unit toward and terminate adjacent the second side wall 20 of the vehicle. At least one opening 114 in the air-return duct 113 is located adjacent the termination 115 of the air-return duct adjacent the first side wall 18 of the vehicle, and at least one opening 116 in the air-return duct 113 is located adjacent the termination 117 of the air-return duct 113 adjacent the second side wall 20. Openings 119 located in the air-return duct 113 on both sides of the air-distribution duct 111 are in air-flow communication with the inlet portion 38 of the air-conditioning unit 27 by means of suitable ducting, including plenum arrangements, between the openings 119 and the inlet portion 38 of the air-conditioning unit as will be understood by those having ordinary skill in the art. The arrows in FIG. 11 indicate the direction of air flow in the air-distribution duct 111 and the air-return duct 113 in that embodiment of the invention.

Figure 12:
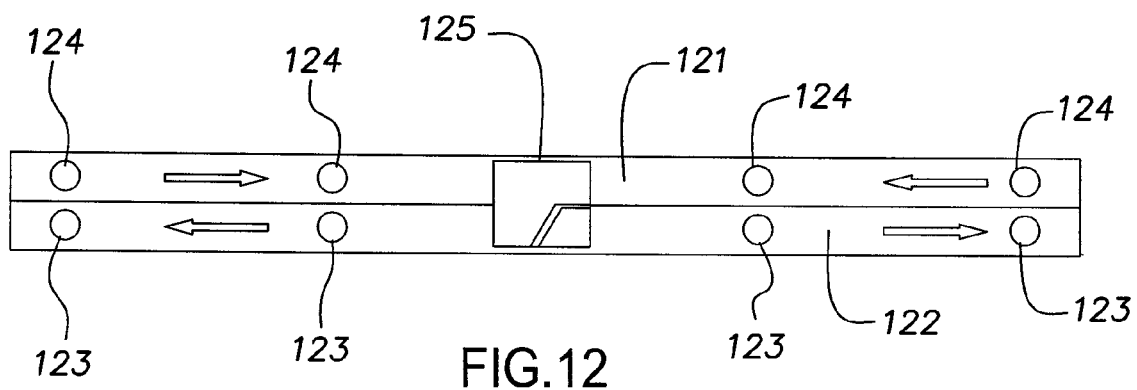
FIG. 12 is a somewhat schematic representation of a seventh embodiment of the invention.

A seventh embodiment of the air-conditioning system of the invention is shown in FIG. 12 as seen from above. In that embodiment, both the air-distribution duct 122 and the air-return duct 121 are adapted to extend linearly along a substantial portion of the length of the interior of the vehicle between the front end 22 and the rear end 24 of the vehicle on either side of the outlet and inlet portions 36 and 38, respectively, of the air-conditioning unit. The air-distribution duct 122 includes openings 123 through which conditioned air can be distributed to the interior of the vehicle, and the air-return duct 121 includes openings 124 through which unconditioned air can be returned to the inlet portion 38 of the air-conditioning unit 27 as indicated by the arrows on the air-distribution duct 122 and the air-return duct 121. The plenum 125 isolates the conditioned air from the air-return duct and directs the conditioned air from the outlet portion 36 of the air-conditioning unit 27 into air distribution duct 122. The plenum 125 also isolates the return air in the air-return duct 121 and directs the return air to the inlet portion 38 of the air-conditioning unit 27 where the return air is conditioned and redistributed to the vehicle interior by means of the air-distribution duct 122.

It will be understood that the present invention in its various embodiments, by providing air-return ducts that extend to areas of the interior of a vehicle that are substantially removed from where the discharge location of the air-return ducts is located and by providing openings in the air-return ducts at outlying locations within the interior of the vehicle, allows for the efficient removal of unconditioned air from the vehicle interior that might otherwise remain in the vehicle interior and stagnate or only be removed inefficiently. For example, in those instances where a vehicle air-conditioning system provides only for the removal of unconditioned air from a central localized area of the vehicle interior, air along the side walls of the vehicle will not be efficiently removed. On the other hand, certain embodiments of the invention that have been described provide for the efficient removal of unconditioned air from along the vehicle side walls so that conditioned air can more effectively move to the vehicle side walls. In general, the present invention by providing air-return ducts that extend to outlying areas of the vehicle interior, allows for the good displacement of conditioned air which can result in faster cool-down times for the vehicle interior. In addition, noise levels that are experienced when air is removed only from a localized area of the vehicle interior that lies substantially directly below the air-conditioning unit can be minimized by the present invention.

Although particular embodiments of the invention have been described in detail above, it will be understood that the invention is not limited to those embodiments but includes all changes and modifications that are within the literal and equivalent scope of the claims that follow.

What is claimed is:

1. An air-conditioning system for a vehicle that includes: a roof; a ceiling; a first side wall and a second side wall; and a front end and a rear end, the air-conditioning system comprising:

single air-conditioning unit mounted at the roof of the vehicle, the air-conditioning unit including an outlet portion for discharging air conditioned by the air-conditioning unit and an inlet portion for receiving air solely from the interior of the vehicle, each of the outlet portion and inlet portion of the air-conditioning unit being located between the front end and the rear end of the vehicle and between the first side wall and the second side wall of the vehicle;

a plenum chamber including a divider mounted within the plenum chamber to divide the plenum chamber into a return portion and a discharge portion, the return portion being in communication with the inlet portion of the air-conditioning unit and the discharge portion being in communication with the outlet portion of the air-conditioning unit;

at least one air-distribution duct supported between the ceiling and the roof of the vehicle in air flow communication with the outlet portion of the air-conditioning unit and the discharge portion of the plenum chamber, the at least one air-distribution duct being adapted to extend in opposite directions from the air-conditioning unit along a substantial portion of the interior of the vehicle from the outlet portion of the air-conditioning unit toward the front end of the vehicle and from the outlet portion of the air-conditioning unit toward the rear end of the vehicle and including at least one opening through which air conditioned by the air-conditioning unit can be discharged to the interior of the vehicle from the single air-distribution duct; and at least one air-return duct supported between the ceiling and the roof of the vehicle and including at least one opening through which air from the interior of the vehicle can pass into the at least one air-return duct and be discharged from the at least one air-return duct at a discharge location, only the at least one air-return duct being in air flow communication with the return portion of the plenum chamber and the inlet portion of the air-conditioning unit at the discharge location of the at least one air-return duct whereby only air from the interior of the vehicle discharged at the discharge location is returned to the inlet portion of the single air-conditioning unit, the at least one air-return duct engaging the inlet portion of the single air-conditioning unit and extending away from engagement with the inlet portion of the single air-conditioning unit in opposite directions, one end of the at least one air-return duct terminating proximate the intersection of the ceiling of the vehicle and at least one of the first side wall and second side wall of the vehicle intermediate the front end and the rear end of the vehicle with at least one of the at least one opening in the at least one air-return duct through which air from the interior of the vehicle can pass into the at least one air-return duct being located adjacent the termination of the at least one air-return duct proximate the intersection of the ceiling of the vehicle and the at least one of the first side wall and second side wall of the vehicle intermediate the front end and the rear end of the vehicle, whereby air from the interior of the vehicle toward the front end of the vehicle returns to the inlet portion of the single air-conditioning unit in one direction and the other end of the at least one air return duct terminating proximate the intersection of the ceiling of the vehicle and the other of the first side wall and second side wall of the vehicle intermediate the front end and the rear end of the vehicle with at least one of the at least one opening in the at least one air-return duct through which air from the interior of the vehicle can pass into the at least one air-return duct being located adjacent the termination of the at least one air-return duct proximate the intersection of the ceiling of the vehicle and the other of the first side wall and the second side wall of the vehicle intermediate the front end and the rear end of the vehicle, whereby air from the interior of the vehicle toward the rear end of the vehicle returns to the inlet portion of the single air-conditioning unit in the opposite direction.

2. The air-conditioning system of claim 1 wherein the single air-return duct comprises at least two air return ducts that extend away from the inlet portion of the single air-conditioning unit toward the intersection of the ceiling of the vehicle and at least one side wall of the vehicle intermediate the front end and the rear end of the vehicle and from that location along a substantial portion of the length of the interior of the vehicle between the front end and the rear end of the vehicle, at least a respective one of the at least two air return ducts being located at each side of the inlet portion of the single air-conditioning unit.

3. The air-conditioning system of claim 1 wherein the at least one air-return duct extends away from the inlet portion of the single air-conditioning unit toward and terminates proximate the intersection of the ceiling of the vehicle intermediate the front end and the rear end of the vehicle and the first side wall of the vehicle and away from the inlet portion of the single air-conditioning unit and toward and terminates proximate the intersection of the ceiling of the vehicle and the second side wall of the vehicle intermediate the front end and the rear end of the vehicle.

4. The air-conditioning system of claim 3 wherein at least one of the at least one opening in the at least one air-return duct is located adjacent the termination of the at least one air-return duct proximate the intersection of the ceiling of the vehicle and the first side wall of the vehicle and at least one of the at least one opening in the at least one air-return duct is located adjacent the termination of the at least one air-return duct proximate the intersection of the ceiling of the vehicle and the second side wall of the vehicle.

5. The air-conditioning system of claim 1 wherein the at least one air-return duct is adapted to extend substantially linearly along a substantial portion of the length of the interior of the vehicle between the front end and the rear end of the vehicle.

6. The air-conditioning system of claim 1 wherein the at least one air- distribution duct comprises: a pair of air-distribution ducts, each of which is of a length adapted to extend from a first end located toward the front end of the vehicle to a second end located toward the rear end of the vehicle; and an air-distribution cross duct between the pair of air-distribution ducts located intermediate the length of each air-distribution duct, the air-distribution cross duct being in air flow communication with each of the pair of air-distribution ducts and the outlet portion of the air-conditioning unit, whereby air conditioned by the air-conditioning unit can flow through the air-distribution cross duct to the pair of air-distribution ducts.

7. The air-conditioning system of claim 6 wherein openings in the pair of air-return ducts are located at each of the first end and second end of each of the pair of air-return ducts.

8. The air-conditioning system of claim 1 wherein each of the outlet portion and the inlet portion of the air-conditioning unit are located nearer the center than either the front end or the rear end of the vehicle and nearer the center than either the first side wall or the second side wall of the vehicle.

* * * * *